US007236537B2

(12) United States Patent
Hottinen et al.

(10) Patent No.: US 7,236,537 B2
(45) Date of Patent: *Jun. 26, 2007

(54) METHOD AND RADIO SYSTEM FOR DIGITAL SIGNAL TRANSMISSION

(75) Inventors: Ari Hottinen, Espoo (FI); Risto Wichman, Helsinki (FI)

(73) Assignee: Nokia Corporation, Espoo (FI)

( * ) Notice: Subject to any disclaimer, the term of this patent is extended or adjusted under 35 U.S.C. 154(b) by 527 days.

This patent is subject to a terminal disclaimer.

(21) Appl. No.: 09/879,831

(22) Filed: Jun. 13, 2001

(65) Prior Publication Data

US 2002/0012380 A1 Jan. 31, 2002

Related U.S. Application Data

(63) Continuation of application No. PCT/FI99/01037, filed on Dec. 15, 1999.

(30) Foreign Application Priority Data

Dec. 15, 1998 (FI) ...................................... 982715

(51) Int. Cl.
H04B 7/02 (2006.01)
(52) U.S. Cl. ...................... 375/267; 375/259; 375/229; 375/130; 375/232; 455/522; 455/526; 714/792
(58) Field of Classification Search ................ 375/267, 375/229, 259, 232, 130; 455/69, 456, 522, 455/355
See application file for complete search history.

(56) References Cited

U.S. PATENT DOCUMENTS

| 5,541,607 | A | | 7/1996 | Reinhardt |
| 5,781,541 | A | * | 7/1998 | Schneider ................... 370/335 |
| 6,131,016 | A | * | 10/2000 | Greenstein et al. ........... 455/69 |
| 6,154,485 | A | * | 11/2000 | Harrison ...................... 375/130 |
| 6,463,295 | B1 | * | 10/2002 | Yun ............................. 455/522 |
| 6,889,355 | B1 | * | 5/2005 | Calderbank et al. ........ 714/792 |
| 7,058,363 | B2 | * | 6/2006 | Hottinen et al. .............. 455/69 |
| 2001/0033614 | A1 | * | 10/2001 | Hudson |
| 2003/0073410 | A1 | * | 4/2003 | Hottinen et al. |
| 2004/0072579 | A1 | * | 4/2004 | Hottinen |

FOREIGN PATENT DOCUMENTS

| EP | 687 976 | 12/1995 |
| EP | 806844 | 11/1997 |
| EP | 844 765 | 6/1998 |
| WO | WO 97/41670 | 11/1997 |

OTHER PUBLICATIONS

Hottinen et al., "Transmit Diversity by Antenna Selectionin CDMA Downlink," 1998 IEEE 5th International Symposium on Spread Spectrum Techniques and Applications, 1998 Proceedings, vol. 3, Sep. 2-4, 1998, pp. 767-770.
Ylitalo et al., "An Adaptive Antenna Method for Improving Downlink Performance of DCMA Base Stations," IEEE Fifth International Symposium on Spread Spectrum Techniques and Applications, vol. 2/3, Sep. 2-4, 1998, pp. 599-603.
Calderbank et al., "Space-Time Coding for High Data Rate Wireless Communications," Fifth Workshop on Smart Antennas in Wireless Mobile Communications, Jul. 23-24, 1998, Stanford University, 18 pp.

* cited by examiner

Primary Examiner—Chieh M. Fan
Assistant Examiner—Eva Zheng
(74) Attorney, Agent, or Firm—Pillsbury Winthrop Shaw Pittman LLP (57) ABSTRACT

The invention relates to a method and a radio system for transmitting a digital signal. The method comprises the following steps: the transmitter transmits at least a part of the signal via at least two different transmit antenna paths; the transmitter weights the transmit power of the signals to be transmitted via the different transmit antenna paths with respect to one another by means of changeable weighting coefficients determined for each transmit antenna path; the receiver receives the signal.

4 Claims, 8 Drawing Sheets

METHOD AND RADIO SYSTEM FOR DIGITAL SIGNAL TRANSMISSION

This is a Continuation of International Application PCT/FI99/01037 which was filed on Dec. 15, 1999 and designated the U.S. and that International Application was filed in English, and further claims priority to Finnish application No. 982715, filed Dec. 15, 1998, the contents of both of which are incorporated herein in their entirety by reference.

FIELD OF THE INVENTION

The invention relates to a method and a radio system for transmitting a digital signal in a radio system, particularly in a mobile system. More precisely, the invention relates to the use of transmit diversity.

BACKGROUND OF THE INVENTION

In mobile systems, signal fading over the radio path interferes with reliable transmission. The problem is aggravated in new systems where rather high data transfer rates are transmitted, in addition to speech, together with new services, such as data transmission, which require a very good bit error ratio.

A possible solution to the problem is the use of transmit diversity. This means that the base station transmits a signal to a user equipment by means of two or more different antennas. Therefore the multipath signal components which have propagated via different channels will not likely be disturbed by simultaneous fading.

In selective transmit diversity (STD), the base station transmits a signal to a user equipment by using at least two different antenna candidates. The user equipment measures the quality of the signal transmitted by each antenna candidate and selects the antenna that provides the best quality. The user equipment signals the identification data of the selected antenna to the base station, whereafter the network part of the mobile system guides the transmissions to the user equipment via the selected antenna. This kind of signalling method forms closed loop control. A problem with this method is that the user equipment must be able to reliably signal the identification data of the selected antenna to the network part. STD is described in *Transmit Diversity by Antenna Selection in CDMA Downlink* by Ari Hottinen and Risto Wichman (IEEE Fifth International Symposium on Spread Spectrum Techniques & Applications. IEEE ISSSTA '98 Proceedings. Sep. 2–4, 1998, Sun City, South Africa), which is incorporated herein by reference.

Another manner of implementing transmit diversity is the use of Space-Time Transmit Diversity (STTD). The operating principle of STTD differs from STD in that in STTD a signal is transmitted continuously to a user equipment by means of at least two different antennas. The signals that are transmitted via separate antennas are different. There are two manners of implementing the difference: space-time trellis codes and space-time block codes.

Space-time trellis codes are described in WO 97/41670, which is incorporated herein by reference. They provide both coding and diversity gain. The codes are formed by means of a trellis diagram, which describes with two symbols each possible state and branches to other states. When the initial state of the trellis is known, the bits to be coded can be indicated in the trellis diagram by means of symbols denoting transfers between different levels. The obtained symbols are thereafter distributed for transmission via different antennas.

In space-time block codes the bits to be coded are divided for example into two-bit sequences, which are formed into symbols to be transmitted, such that the symbol to be transmitted via the first antenna consists of the first bit and the complex conjugate of the second bit, and the symbol to be transmitted via the second antenna consists of the second bit and the complex conjugate of the first bit. The formation of space-time block codes is described in *Space-Time Coding for High Data Rate Wireless Communications* by A. R. Calderbank, Hamid Jafakhani, Ayman Naguib, Nambi Seshadri and Vahid Tarokh (Fifth Workshop on Smart Antennas in Wireless Mobile Communications. Jul. 23–24, 1998, Stanford University), which is incorporated herein by reference.

In STTD, the transmit power of transmit antennas is constant or it can be controlled by means of closed loop control, wherein a user equipment measures the quality of the signals it has received, and based thereon, the network part adjusts the absolute transmit power of the signal it transmits via the antennas, such that the ratio of the transmit powers is always the same over each transmit antenna path utilizing transmit diversity. However, the arrangement can cause an unnecessarily great deal of interference to other users in the mobile system. This method also has the problem of reliability of signalling, in other words the user equipment must be able to reliably signal power control data to the network part.

BRIEF DESCRIPTION OF THE INVENTION

An object of the invention is to develop a method and equipment implementing the method so as to solve the aforementioned problems. This is achieved with the method described below, which is a method of transmitting a digital signal from a transmitter to a receiver in a radio system, the method comprising: the transmitter transmitting at least a part of the signal via at least two different transmit antenna paths; the receiver receiving the signal. The transmit power of the signals to be transmitted via different transmit antenna paths is weighted with respect to one another in the transmitter by means of changeable weighting coefficients determined for each transmit antenna path.

The invention also relates to a radio system for transmitting a digital signal, the system comprising a transmitter for transmitting a signal; at least two transmit antenna paths that can be connected to the transmitter; a receiver for receiving the signal. The transmitter comprises changing means for changing the weighting coefficients determined for each transmit antenna path with respect to one another, and weighting means for weighting the transmit power of the signals to be transmitted via different transmit antenna paths by means of weighting coefficients that can be changed with respect to one another.

The preferred embodiments of the invention are disclosed in the dependent claims.

The invention is based on developing further the adjustment of transmit power such that each transmit antenna path used in the transmit diversity will be adjusted separately. However, the power levels of the transmit antenna paths are adjusted with respect to one another. This means that the adjustment is not the same for all the transmit antenna paths, nor is the adjustment performed mutually independently on each transmit antenna path.

The method and the system according to the invention provide several advantages. Errors in closed loop control, for example in signalling from a user equipment to a base station, do not significantly deteriorate the capacity of the system. In the prior art, a receiver blindly follows the antenna selection commands by the closed loop, which causes a random change of the transmit antenna due to erroneous commands. This weakens signal quality.

BRIEF DESCRIPTION OF THE DRAWINGS

The invention will be described in greater detail by means of preferred embodiments with reference to the accompanying drawings, in which.

DETAILED DESCRIPTION OF THE INVENTION

The invention can be used in radio systems where at least a part of a signal can be transmitted over at least two transmit antenna paths. A transmission channel can be formed by means of a time division, frequency division or code division multiple access method, for example. The invention also covers systems utilizing combinations of different multiple access methods. The examples describe the use of the invention in a universal mobile telecommunications system employing a direct sequence wideband code division multiple access method, without restricting the invention thereto, however.

The structure of a universal mobile telecommunications system will be described below with reference to FIGS. 1A and 1B. FIG. 1B shows only the blocks that are essential for illustrating the invention, but it is evident to those skilled in the art that a conventional mobile system also includes other functions and structures which do not have to be described in greater detail herein. The main components of a mobile system are a core network CN, a UMTS terrestrial radio access network UTRAN and a user equipment UE. The interface between the CN and the UTRAN is called Iu, and the air interface between the UTRAN and the UE is called Uu.

The UTRAN consists of radio network subsystems RNS. The interface between RNSs is called Iur. An RNS consists of a radio network controller RNC and one or more nodes B. The interface between an RNC and node B is called Iub. The coverage area of node B, i.e. a cell, is denoted in FIG. 1B by C.

Figure 1A:
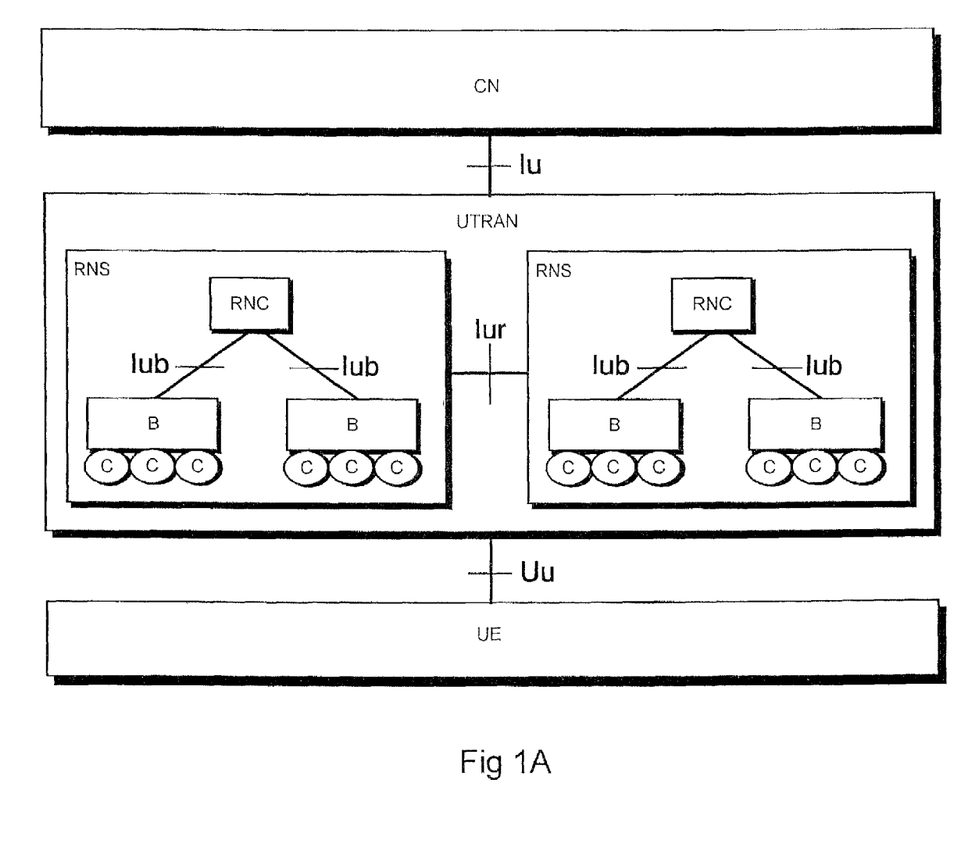
FIGS. 1A and 1B show an example of a system according to the invention.
Figure 1B:
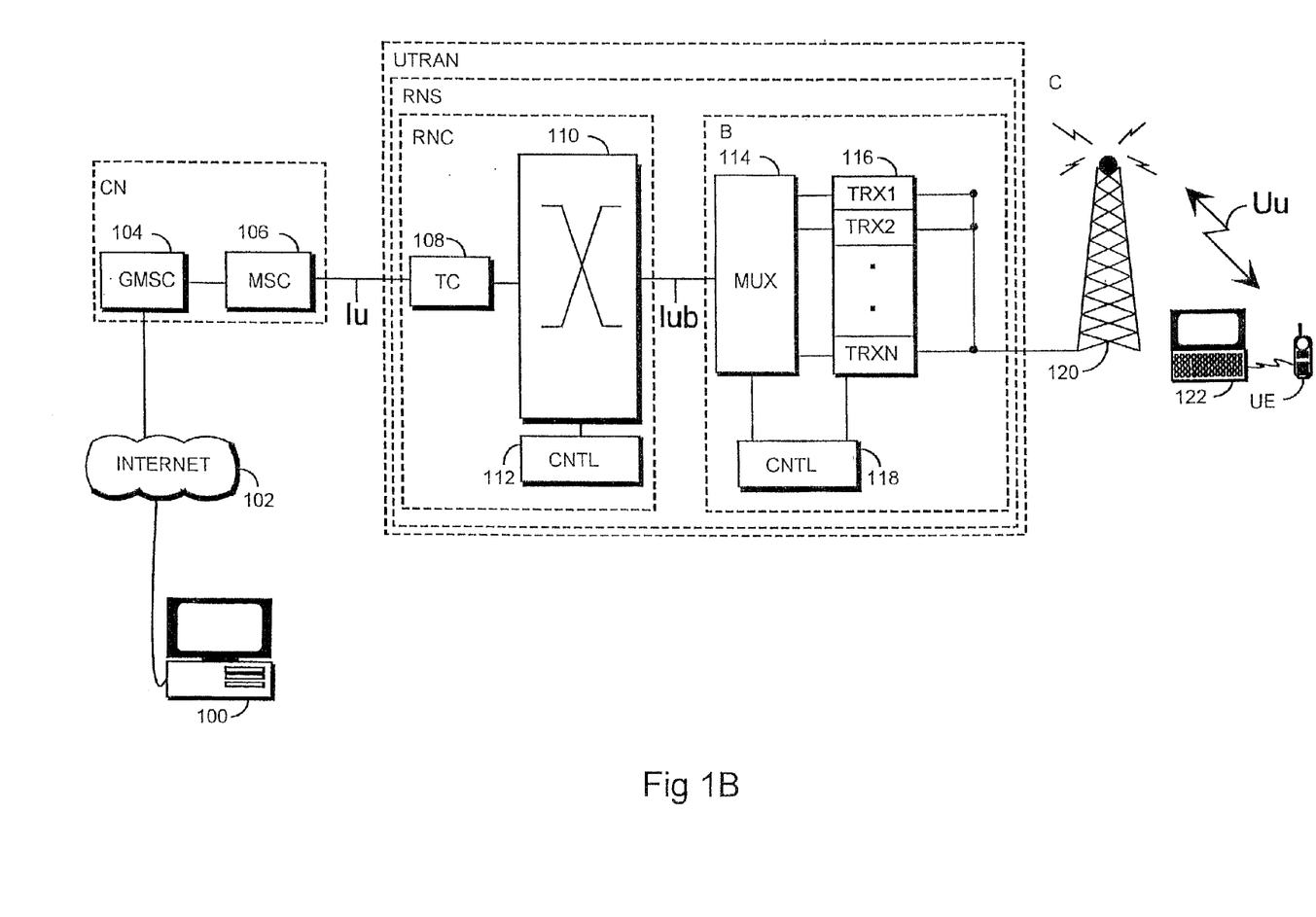

The illustration in FIG. 1A is extremely abstract, wherefore it is further clarified in FIG. 1B by showing which parts of the GSM system and the UMTS approximately correspond to one another. It should be noted that the mapping disclosed herein is not restrictive but only suggestive, since the responsibilities and functions of different parts of the UMTS are still under development.

FIG. 1B shows packet transmission via the Internet 102 from a computer 100 that is connected to a mobile system to a portable computer 122 connected to a user equipment UE. The UE can be for example a fixedly positioned terminal equipment, an equipment placed in a vehicle or a portable hand-held device. The radio network infrastructure UTRAN consists of radio network subsystems RNS or base station systems. An RNS consists of a radio network controller RNC or a base station controller, and at least one node B or base station it controls.

The base station B comprises a multiplexer 114, transceivers 116 and a control unit 118, which controls the operation of the transceivers 116 and the multiplexer 114. The multiplexer 114 places traffic and control channels used by several transceivers 116 on the transmission connection Iub.

The transceivers 116 of the base station B are connected to an antenna unit 120, which implements a bidirectional radio connection Uu to the user equipment UE. The structure of the frames transmitted over the bidirectional radio connection Uu is accurately specified.

The base station controller RNC comprises a group switching field 110 and a control unit 112. The group switching field 110 is used to switch speech and data and to combine signalling circuits. The base station system consisting of the base station B and the base station controller RNC also comprises a transcoder 108. The division of operations between the base station controller RNC and the base station B and the physical structure of the elements may vary in different implementations. The base station B typically manages the implementation of the radio path as described above. The base station controller RNC typically controls the following matters: radio resource management, control of inter-cell handover, power control, timing and synchronization, and paging of user equipments.

The transcoder 108 is usually situated as close to a mobile services switching centre 106 as possible in order that speech can be transmitted in a mobile telephone system form between the transcoder 108 and the base station controller RNC, thus saving transmission capacity. The transcoder 108 adapts different digital speech coding forms used between a public switched telephone network and a mobile telephone network to each other, such that it converts for example a 64 kbit/s fixed network form into some other (such as a 13 kbit/s) form of the cellular radio network, and vice versa. The required equipment is not described in greater detail herein. Suffice it to say that speech is the only type of data that is converted in a transcoder 122. The control unit 112 performs call control, mobility management, collection of statistical data, and signalling.

The core network CN consists of the infrastructure of the mobile telephone system outside the UTRAN. From the devices of the core network CN, FIG. 1B shows the mobile services switching centre 106 and a gateway mobile services switching centre 104, which manages the connections from the mobile telephone system to the outside world, in this case to the Internet 102.

Figure 2A:
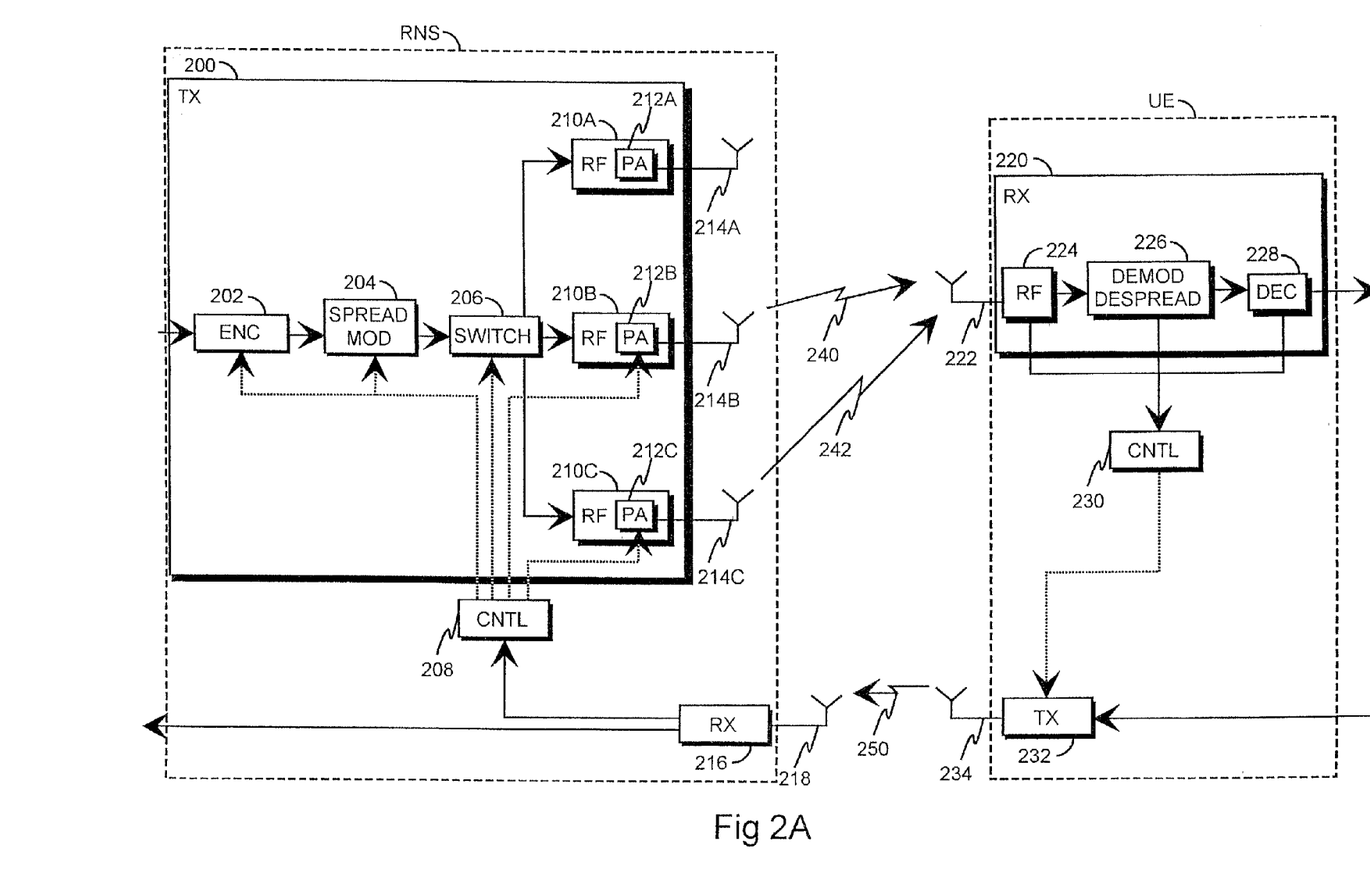
FIG. 2A shows the operation of a transmitter and a receiver according to the invention.
Figure 2B:
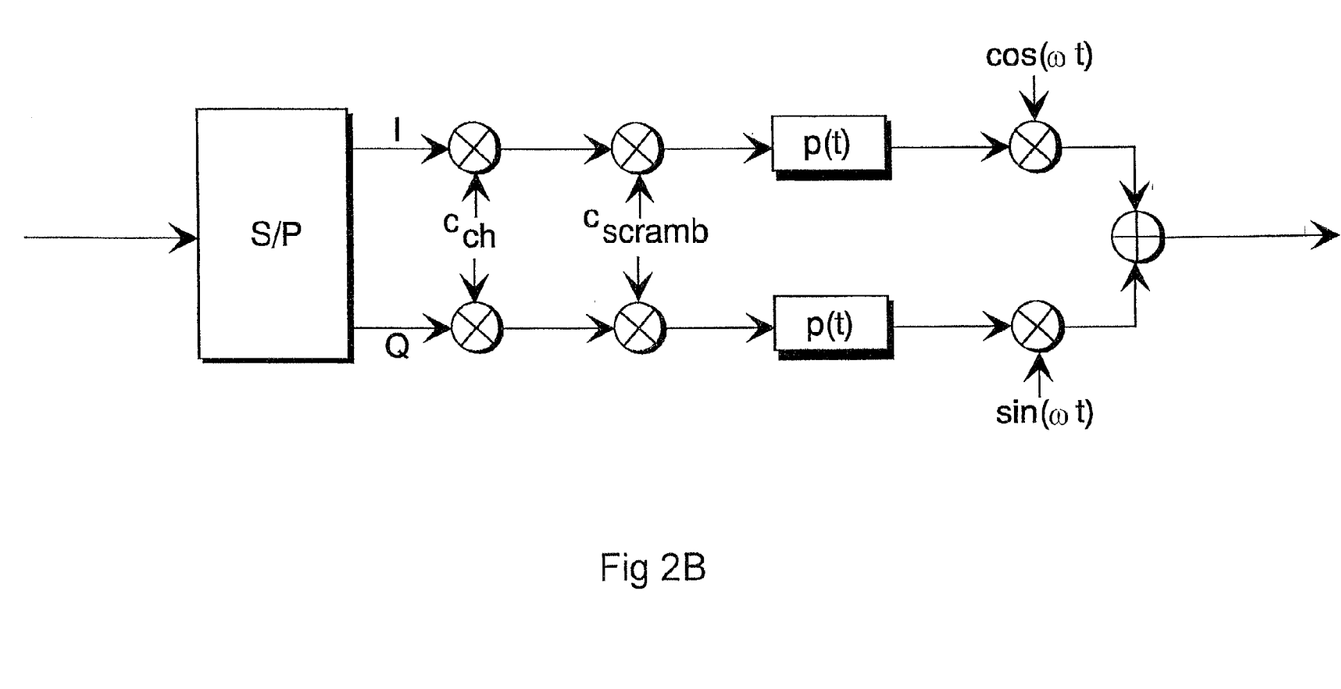
FIG. 2B shows spreading and modulation carried out in the transmitter.

FIG. 2B shows in more detail the spreading of a channel with a spreading code and the modulation of the channel. A channel bit stream arrives at block S/P from the left in the figure. In the block each two-bit sequence is converted from a serial form into a parallel form, which means that one bit is supplied to the I branch of the signal and the other bit is supplied to the Q branch. The I and Q branches of the signal are then multiplied by the same spreading code $c_{ch}$, thus spreading relatively narrowband information over a broad frequency band. Each connection Uu has its own spreading code, which enables the receiver to identify transmissions intended for it. The signal is thereafter scrambled by multiplying it by a scrambling code $c_{scramb}$, which is different for each user equipment and base station. The pulse form of the obtained signal is filtered by a filter p(t). Finally, the signal is modulated into a radio-frequency carrier by multiplying the different signal branches by a carrier. There is a phase shift of 90 degrees between the carriers of the different branches. The different branches are combined into a single carrier, which is ready for transmission to the radio path Uu, excluding possible filtrations and power amplifications. The modulation method described is quadrature phase shift keying (QPSK).

The maximum number of mutually orthogonal spreading codes that can be used simultaneously is typically 256 different codes. For example in the UMTS, with a carrier of 4.096 megachips, spreading factor 256 corresponds to a transfer rate of 32 kbit/s, and the corresponding highest transfer rate in practice is achieved with spreading factor 4, which gives a data transfer rate of 2048 kbit/s. The transfer rate on a channel thus varies in steps of 32, 64, 128, 256, 512, 1024 and 2048 kbit/s, and the spreading factor changes correspondingly as follows: 256, 128, 64, 32, 16, 8 and 4. The data transfer rate allocated to a user depends on the channel coding used. For example with ⅓ convolutional coding, the user data transfer rate is usually about one third of the channel data transfer rate. The spreading factor may indicate the length of the spreading code. For example the spreading code corresponding to spreading factor 1 is (1). Spreading factor 2 has two mutually orthogonal spreading codes: (1,1) and (1,-1). Further, spreading factor 4 has four mutually orthogonal spreading codes: below a higher-level spreading code (1,1) are spreading codes (1,1,1,1) and (1,1,-1,-1), and below another higher-level spreading code (1,-1) are spreading codes (1,-1,1,-1) and (1,-1,-1,1). Spreading codes on a particular level are usually mutually orthogonal, for example when a Walsh-Hadamard code set is used.

An example of a frame structure that can be used on a physical channel will be described with reference to FIG. 4. Frames 440A, 440B, 440C, 440D are numbered consecutively from one to seventy-two, and they form a 720-millisecond superframe. The length of one frame 440C is 10 milliseconds. A frame 440C is divided into 16 slots 430A, 430B, 330C, 330D. The length of one slot 330C is 0.625 milliseconds. One slot 430C typically corresponds to one power control period, during which the power is adjusted for example by one decibel up or down.

Physical channels are divided into different types, including common physical channels and dedicated physical channels. Dedicated physical channels consist of dedicated physical data channels (DPDCH) 410 and dedicated physical control channels (DPCCH) 412. The DPDCHs 410 are used to carry data 406 generated in layer two of OSI (Open Systems Interconnection) and in the layers above it, i.e. dedicated control channels and dedicated traffic channels. The DPCCHs 412 carry control information generated in layer one of the OSI. The control information comprises: pilot bits 400 used in channel estimation, transmit power control commands (TPC) 402, and optionally a transport format indicator (TFI) 404. The transport format indicator 404 indicates to the receiver the current transfer rate for each uplink DPDCH.

Figure 4:
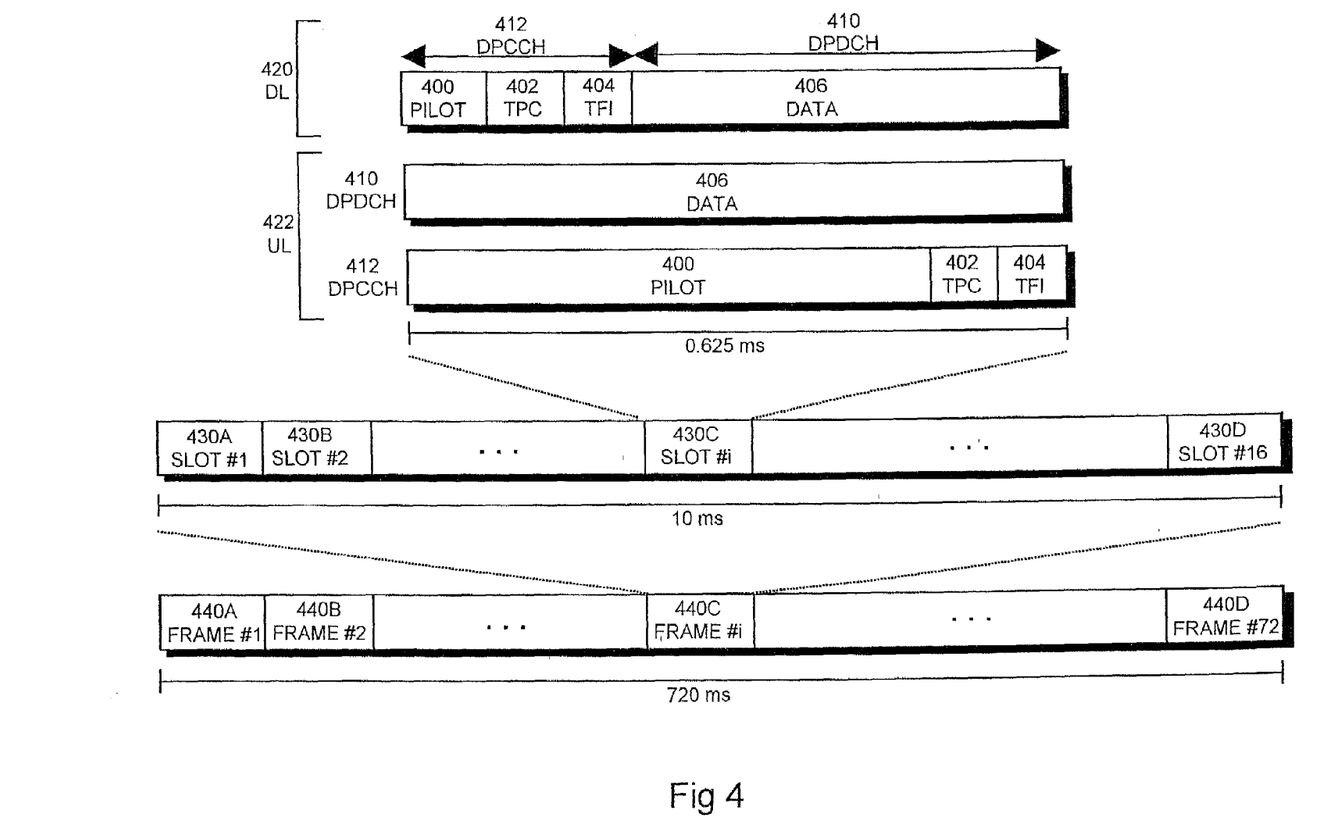
FIG. 4 shows channels of the mobile system placed in a frame.

As FIG. 4 shows, the downlink DPDCHs 410 and DPCCHs 412 are time-multiplexed into the same slot 430C. In the uplink direction the channels are transmitted in parallel so that they are IQ/code-multiplexed (I=in-phase, Q=quadrature) into each frame 440C and they are transmitted using dual-channel quadrature phase-shift keying (QPSK) modulation. If additional DPDCHs 410 are to be transmitted, they are code-multiplexed either into the I or the Q branch of the first channel pair.

FIG. 2A shows a transmitter 200 according to the invention utilizing transmit diversity, and a receiver 220. FIG. 2 shows a downlink situation where the transmitter is situated in a radio network subsystem RNS and the receiver in a user equipment UE.

FIG. 2A shows only the basic functions of the radio transmitter 200. Different services to be conveyed in a physical channel include speech, data, moving or still video image, and system control channels, which are processed in a control part 208 of the radio transmitter. The figure only shows the processing of data. Different services require different source coding means, for example speech calls for a speech codec. However, the source coding means are not shown in FIG. 2A for the sake of clarity.

Packets from the computer 100 arrive at the radio network subsystem RNS as shown in FIG. 1B, and they are subjected to channel coding in a channel coder 202. The channel coding is typically convolutional coding or different modifications thereof, such as turbo coding. Channel coding also includes different block codes, such as cyclic redundancy check (CRC) and the Reed-Solomon code.

The space-time codes described above can also be used. In the case of space-time block codes, a signal can be first coded with for example Reed-Solomon coding and thereafter with space-time block coding. In space-time block coding the symbols to be transmitted, $S_1$ and $S_2$, are divided into two different transmit antenna paths such that signal $[S_1 - S_2^*]$ is transmitted via the first path 214B and signal $[S_2 \, S_1^*]$ is transmitted via the second path 214. Symbol * describes the complex conjugate of the signal. The signals formed in this manner are mutually orthogonal and can be transmitted with the same spreading code. Other possibilities of implementing orthogonality include the use of a specific spreading or channel code, a different transmission frequency or a different slot in transmission for each transmit antenna branch.

The signal received over path j at instant T is $$r_j^1 = w_1 \alpha_j^1 S_1 - w_2 \alpha_j^2 S_2^* + n_j^1, \qquad (1)$$

wherein a weighting coefficient for the transmit power of antenna j is denoted by $w_j$, and symbol $a_j^i$ denotes Rayleigh fading of the $j^{th}$ multipath of the $i^{th}$ transmit antenna path in the receiver. Correspondingly, $r_j^k$ represents the $j^{th}$ multipath-propagated signal of the received signal, and $n_j^k$ denotes additive white gaussian noise summed in the $j^{th}$ multipath-propagated signal.

Correspondingly, a signal received at instant 2T is $$r_j^2 = w_1 \alpha_j^1 S_2 + w_2 \alpha_j^2 S_1^* + n_j^2 \qquad (2)$$

Denote below $\hat{\alpha} = w\alpha$, whereupon linear processing provides the following soft outputs for symbols $S_1$ and $S_2$ of the $j^{th}$ path $$r_j^1 \hat{\alpha}_j^{1*} + r_j^{2*} \hat{\alpha}_j^2 = (|\hat{\alpha}_j^1|^2 + |\hat{\alpha}_j^2|^2) S_1 + n_j^1 \hat{\alpha}_j^{1*} + n_j^{2*} \hat{\alpha}_j^2 \qquad (3)$$

and $$-r_j^{1*} \hat{\alpha}_j^2 + r_j^2 \hat{\alpha}_j^{1*} = (|\hat{\alpha}_j^1|^2 + |\hat{\alpha}_j^2|^2) S_2 - n_j^{1*} \hat{\alpha}_j^2 + n_j^2 \hat{\alpha}_j^{1*} \qquad (4)$$

The soft outputs of all the multipaths can be combined to provide a net soft output for symbol $S_1$ $$\sum_{j=1}^{L} r_j^1 \hat{\alpha}_j^{*1} + r_j^{2*} \hat{\alpha}_j^2, \quad (5)$$

wherein L is the total number of the received multipaths. Correspondingly, the net soft output for symbol $S_2$ is obtained as follows $$\sum_{j=1}^{L} -r_j^{1*} \hat{\alpha}_j^2 + r_j^2 \hat{\alpha}_j^{1*} \quad (6)$$

Interleaving is not shown in FIG. 2A. The purpose of interleaving is to facilitate error correction. In the interleaving signal bits are mixed together in a certain manner, and therefore a momentary fade over the radio path does not necessarily make the transmitted information impossible to identify.

The signal is spread by a spreading code, scrambled by a scrambling code and modulated in a block 204, the operation of which was described in greater detail in connection with FIG. 2B.

In a switching field 206 the signal is divided to different transmit antenna paths 214A, 214B, 214C. The control unit 208 controls the operation of the switching field 206. Transmit diversity is typically implemented such that the same signal is transmitted via at least two different transmit antenna paths 214A, 214B, 214C to the user equipment UE. In the example shown in FIG. 2A, the transmit antenna diversity is implemented by two paths 214B, 214C. When the above-described space-time coding is used, the signal that is transmitted via the different antennas is not the same. In such a case it must be noted that the switching field divides the signals which have at least partly different contents to different transmit antenna paths 214B, 214C.

On each transmit antenna path 214B, 214C the signal is supplied to radio-frequency parts 210B, 210C, which comprise a power amplifier 212B, 212C. The radio-frequency parts 210B, 210C may also comprise filters that restrict the bandwidth. An analogue radio signal 240, 242 is thereafter transmitted via the antenna 214B, 214C to the radio path Uu.

The radio receiver 220 is typically a Rake receiver. An analogue radio-frequency signal 240, 242 is received from the radio path Uu by an antenna 222. The signal 240, 242 is supplied to radio-frequency parts 224 comprising a filter which blocks frequencies outside the desired frequency band. The signal is thereafter converted in a demodulator 226 into an intermediate frequency or directly to a baseband, and the converted signal is sampled and quantized.

Since the signal has arrived via several paths, the multipath-propagated signal components are preferably combined in a block 226 comprising several Rake fingers according to the prior art.

A rowing Rake finger searches for delays for each multipath-propagated signal component. After the delays have been located, each of the different Rake fingers is allocated to receive a specific multipath-propagated signal component. In the reception a received signal component is correlated by the spreading code used, which has been delayed by the delay located for the multipath in question. The different demodulated and despread multipath-propagated components of the same signal are combined to obtain a stronger signal.

The signal is thereafter supplied to a channel decoder 228, which decodes the channel coding used in the transmission, for example block coding and convolutional coding. Convolutional coding is preferably decoded by a Viterbi decoder. Space-time block coding is decoded by means of the linear processing described in connection with formulae 3, 4, 5 and 6. The obtained data that was originally transmitted is supplied to a computer 122 connected to the user equipment UE for further processing.

Figure 3A:
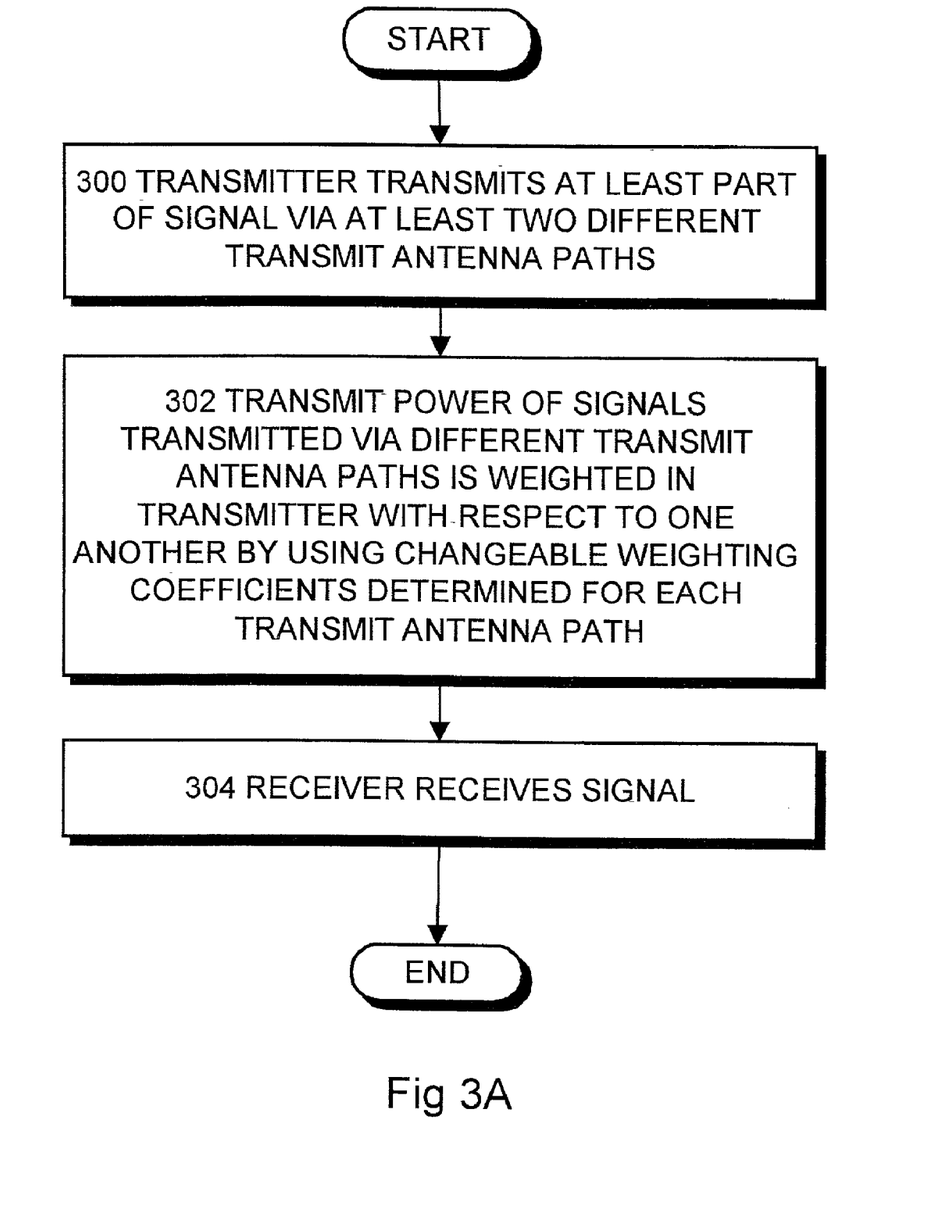
FIG. 3A is a flowchart of the basic method according to the invention.

The method of transmitting a digital signal from the transmitter to the receiver in a radio system comprises the following steps described with reference to FIG. 3A.

In block 300, the transmitter 200 transmits at least a part of the signal via at least two different transmit antenna paths 214B, 214C.

In block 302, the transmit power of the signals to be transmitted via the different transmit antenna paths 214B, 214C is weighted in the transmitter 200 with respect to one another by means of changeable weighting coefficients w determined specifically for each transmit antenna path 214B, 214C.

In block 304, the receiver receives the signal.

When a transmitter is being manufactured or the system is being specified or later, for example when the radio network is being set up, the weighting coefficients can be given default values used by the transmitter in the transmit antenna diversity.

Figure 3B:
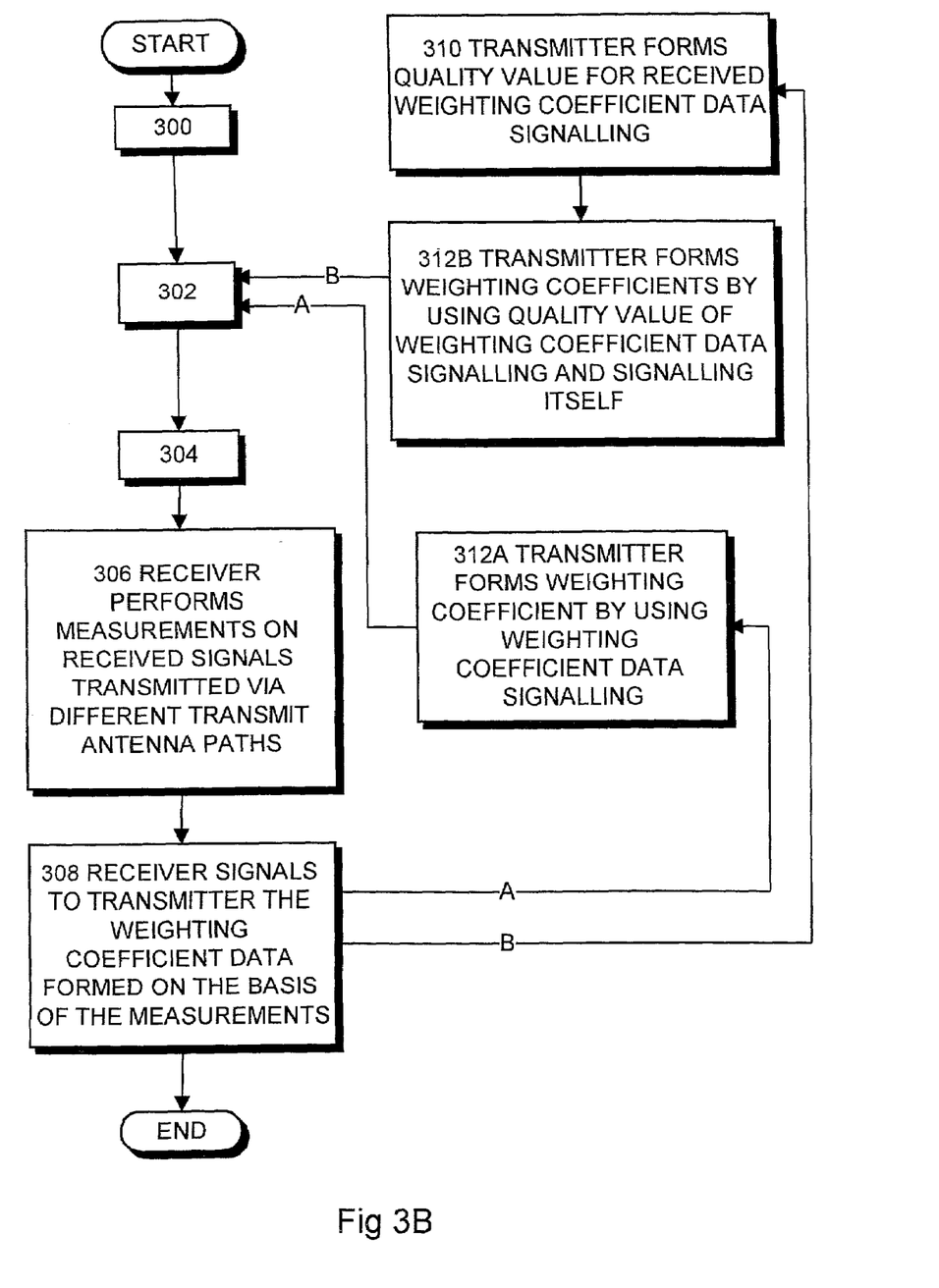
FIG. 3B is a flowchart of the preferred embodiments of the method according to the invention.

FIG. 3B shows how the weighting coefficients can be changed dynamically according to the channel conditions over the radio connection. Blocks 300, 302 and 304 are implemented similarly as in FIG. 3A.

In block 306, the receiver 220 performs measurements on each received signal 240, 242 that was transmitted via a separate transmit antenna path 214B, 214C. The measurements relate to channel conditions, such as channel parameters, signal reception power, bit error ratio, signal/interference plus noise ratio (SINR), or any other manner in which the channel quality can be measured.

In block 308, the receiver 220 signals to the transmitter 200 the weighting coefficient data formed on the basis of the measurements carried out in block 306.

Next, there are two alternative ways to proceed, which are shown in FIG. 3B as two different branches A and B stemming from block 308.

Branch A leads to block 312A, where the transmitter 200 forms weighting coefficients by means of the received signalling indicating the weighting coefficient data.

Branch B leads to block 310, where the transmitter 200 forms a quality value for the weighting coefficient data signalling it has received. In block 312B, the transmitter 200 forms weighting coefficients by means of the quality value for the weighting coefficient data signalling and the signalling itself. A decision on the reliability of the signalling can be made by monitoring the quality value of the signalling: if the signal containing the signalling has propagated in a low-quality channel, it may not be sufficiently reliable to enable a good decision to be made for changing the weighting coefficients by means of the weighting coefficient data signalling. A quality value is formed similarly as described in connection with block 306.

A threshold value can be set for the reliability of signalling. When the quality value of signalling falls below a predetermined threshold value, the weighting coefficients are not changed. Correspondingly, when the quality value of signalling exceeds a predetermined threshold value, the weighting coefficients are changed. According to a special rule, when the quality value of signalling falls below a predetermined threshold value, the weighting coefficients are made equal over each transmit antenna path 214B, 214C used on the connection. The user equipment can also control the transmitter by changing, i.e. either increasing or decreasing, the reliability of the weighting coefficient signal on purpose. The reliability can be decreased for example by lowering the signal transmit power when the weighting coefficient signalling is carried out. In a CDMA system this can also be implemented by spreading the signalling data by a different spreading code than usually. In such a case the base station can either detect the spreading code with which the signalling was carried out or the signal can be despread without this data. In the latter case the received signal is not very reliable since the base station has used a different code to despread the signal than to spread it.

The frequency of the weighting coefficient data signalling is such that the weighting coefficient data can be transmitted in each 0.625-millisecond slot 330C shown in FIG. 4. This means that the change frequency of the weighting coefficients is suitably equal to a typical power control period. The weighting coefficient data can be combined with the transmit power control command field 402 shown in FIG. 4, or it can be placed in some other space reserved for control information in a DPCCH 412.

Weighting coefficient data signalling refers to the signalling the receiver 220 has transmitted to the transmitter 200 to be used in the adjustment of the weighting coefficients. It is evident to those skilled in the art that this signalling can be carried out in several different manners. A few possible manners will be described below, without restricting the invention thereto, however:

1. The weighting coefficient data indicates the transmit antenna path 214B, 214C via which the signal 240, 242 with the best quality value was transmitted. If there are only two transmit antenna paths, one bit is sufficient to convey this data. With more antenna paths more bits are correspondingly used.

2. The weighting coefficient data comprises differential information indicating how the ratios of the weighting coefficients of the transmit antenna paths 214B, 214C are changed differentially. This can be implemented for example with the following contents of the differential information: "transfer two units of the transmit power of the first transmit antenna path 214B to the second path 214C". Differential weighting is an example of a situation where weighting at instant t depends on the relative weighting used at instant t−1. It is also possible to use for example three groups of weighting coefficients: 1: {0.8 0.2}, 2: {0.5 0.5} and 3: {0.2 0,8}, wherein one shift is sufficient for changes 1<->2, 2<->3, but change 1<->3 requires two separate shifts.

3. The weighting coefficient data comprises at least one channel parameter measured by the receiver 220. An advantage of this embodiment is that a great deal of information can be signalled to the transmitter 200, if desired, and therefore the decision on the weighting coefficients can be made by the transmitter 200 which has received a sufficient amount of information. Part of the signal can be used to form transmit antenna paths and part for the weighting of signals of the transmit antenna paths.

4. The values of the weighting coefficients are determined in advance. The predetermined values of the weighting coefficients are divided into different groups, each of which comprises a particular weighting coefficient for each transmit antenna path 214B, 214C. In such a case the weighting coefficient data signalling comprises data about the group of weighting coefficients the receiver 220 wants to be used. With two transmit antenna paths 214B, 214C the groups can be for example as follows: {0.5, 0.5}, {0.8, 0.2} and {0.2, 0.8}. It is assumed that the combined transmit power is one. In the first group the transmit power of each transmit antenna path 214B, 214C is the same. In the second group, the first transmit antenna path 214B transmits at power 0.8 and the second transmit antenna path 214C at power 0.2. In the third group the first transmit antenna path 214B transmits at power 0.2 and the second path 214C at power 0.8. If the channel coding method used also enables transmission via only one transmit antenna path, two more groups can be determined: {1, 0} and {0, 1}. This means that in the fourth group a signal is transmitted via only the first transmit antenna path 214B. Correspondingly, in the fifth group a signal is transmitted to the receiver 220 via only the second transmit antenna path 214C.

The receiver uses the channel coefficients of the received signal for signal detection. In order to enable this the signal conventionally comprises a predetermined, known pilot sequence by means of which the channel can be estimated if the channel coefficients change slowly. When weighting is used, the received channel coefficients change due to both the transmission path and the weighting of the transmitter. Therefore, the receiver 220 can operate better if it knows the weighting coefficients used by the transmitter 200. If great momentary changes are possible in the weighting coefficients used in the transmission, these coefficients are preferably signalled to the receiver 220 by means of identification bits 400 inserted in the transmitted signal. The operating principle of the bits is described in connection with FIG. 4. Also, if the weighting coefficients have been grouped, the identification data of the group of coefficients used in the transmission is signalled to the receiver 220 by means of identification bits inserted in the transmitted signal. If the weighting coefficients are not to be signalled to the receiver 220, the receiver uses for example blind estimation methods to detect the weighting coefficients used. However, this is not even necessary. For example when the weighting coefficients are adjusted such that the relative power between two antennas is adjusted only by one decimal, the receiver 220 does not necessarily detect this adjustment but interprets it as a change in the channel conditions.

Other alternatives of signalling the used weighting coefficients to the receiver include modulation, spreading or coding of the signal specifically for each transmit antenna path.

The weighting coefficients can be determined in two different manners: either the user equipment UE in the radio system determines the weighting coefficients used by the network part of the radio system RNS in transmitting to the user equipment in question, or the network part RNS determines itself the coefficients it uses. Both alternatives provide advantages. If the user equipment UE makes the decision, the amount of the weighting coefficient data to be signalled can possibly be decreased. On the other hand, if the network part RNS makes the decision, it can possibly utilize data about the loading of the RNS that is not known to the user equipment UE. It is naturally possible to use a combination of these two methods to determine the weighting coefficients.

An example of the network data is that the network part of the radio system RNS takes into account the loading of the power amplifier 212B, 212C of each transmit antenna path 214B, 214C when it makes the decision. The power amplifiers 212B, 212C have to be designed to withstand maximum power levels if the signals to be transmitted via the transmit antenna path 214B in question are adjusted to a high power level. The network part RNS can be programmed to observe a particular power limit for a power amplifier. In such a case the network part RNS locates for each radio connection such a combination of transmit antenna paths 214A, 214B, 214C that provides a sufficiently good quality of connection and that loads the power amplifiers 212A, 212B, 212C as evenly as possible.

Figure 5:
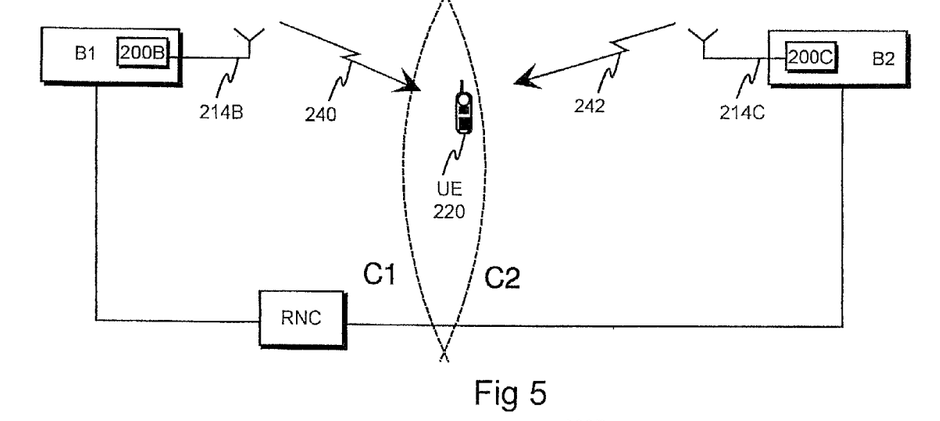
FIG. 5 shows a preferred embodiment of the invention.

The example described in connection with FIG. 2A illustrates the use of the invention in a system where the transmit antenna paths 214A, 214B, 214C used are connected to a single base station B. However, the use of the weighting coefficients according to the invention is also suitable in the system shown in FIG. 5, where a signal 240, 242 is transmitted via the transmitters 200B, 200C and transmit antenna paths 214B, 214C of at least two different base stations B1, B2. A typical situation is a soft handover where the base station controller RNC guides a simultaneous transmission to the user equipment UE for example via two different base stations B1, B2. In such a case the user equipment UE is situated in a border zone between two cells C1, C2. Particularly the methods described in connection with FIG. 3B are suitable in such a situation.

Figure 6:
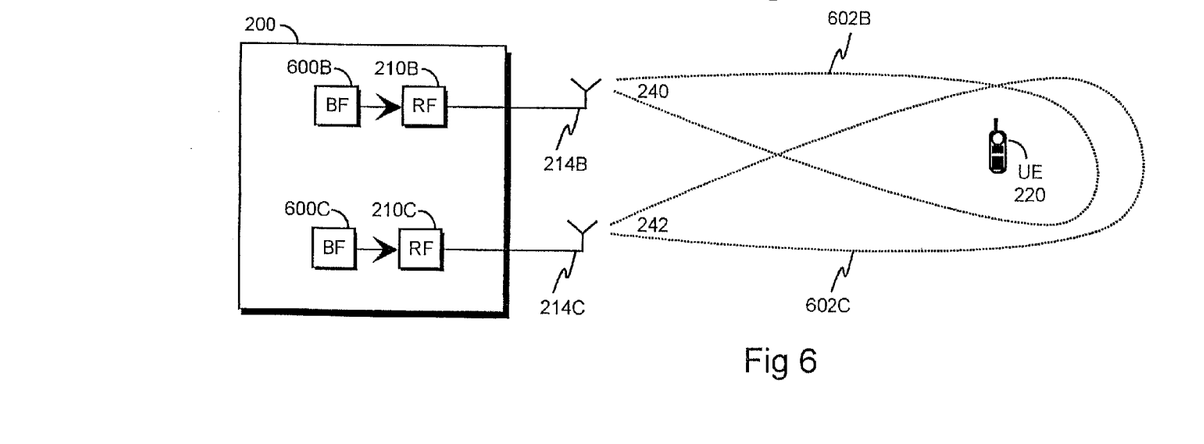
FIG. 6 shows another preferred embodiment of the invention.

Transmit antenna paths 214A, 214B, 214C refer to different ways of implementing an antenna arrangement used in transmission. A common antenna arrangement is the use of omnidirectional antennas. Sectorized base stations B can employ antennas covering a particular transmission sector. A base station B can utilize for example three 1200 transmission sectors or even a higher number of at least substantially overlapping sectors. Another possible antenna arrangement is a structure implementing phasing. A phased antenna arrangement enables transmit antenna diversity with directional antenna beams, for example as shown in FIG. 6. Two different transmit antenna paths 214B, 214C transmit a signal to a user equipment UE by means of a directional antenna beam 602B, 602C. Therefore the transmitter 200 must comprise beam formers 600B, 600C. *An Adaptive Antenna Method for Improving Downlink Performance of CDMA Base Stations* by Juha Ylitalo and Marcos Katz (IEEE Fifth International Symposium of Spread Spectrum Techniques & Applications. IEEE ISSSTA '98 Proceedings. Sep. 2–4, 1998, Sun City, South Africa), which is incorporated herein by reference, discloses the use of adaptive antennas. An essential feature of the invention is that the transmit antenna diversity and the use of weighting coefficients must be possible regardless of the antenna arrangement. When the space-time block coding is used, it is possible to for example determine a pattern for the transmit antenna path (the phases of the different antennas) by means of the signals which have arrived at the receiver, to select the two strongest signals, and to transmit part of the space-time block code simultaneously to these beams. By using an identifier for the beam or the transmit antenna path the user equipment can estimate weighting coefficients for the aforementioned two beams. Naturally, the complex phasing that determines a beam can be signalled to the transmitter by means of a closed loop, but this arrangement is only advantageous if the number of the transmit antennas is low. It is thus possible to separate the measurements and signalling determining the transmit antenna path and the weighting coefficients used for the selected transmit antenna paths. The space-time block coding is advantageous since due to the coding the signal is orthogonal in different beams, wherefore the base station can use the same spreading code in different beams.

The antenna phasing can be determined by means of the channel parameters signalled by the receiver.

The phasing of the transmission can be determined by means of signals arriving at the same antenna elements. This means that transmissions are sent to the same directions from which signals have been received on average. A direction is estimated for example over one slot (0.625 ms), frame (10 ms) or a longer interval of time.

In an embodiment transmissions are sent from at least one antenna element by means of at least two different phases or two different antenna beams, such that the signals that are transmitted with different phases have different pilot sequences, identification sequences, structures or different coding, preferably different parts of a space-time code, by means of which channel parameters of the beams are estimated, signals of the beams are combined, weighting coefficient information of the beams is calculated and signalled to the transmitter.

In the radio system of FIG. 2A, the invention requires that the transmitter 200 comprises changing means 208 for changing the weighting coefficients determined for each transmit antenna path 214B, 214C with respect to one another. The transmitter also comprises weighting means 208, 212B, 212C for weighting the transmit power of the signals 240, 242 to be transmitted via the different transmit antenna paths 214B, 214C by means of weighting coefficients that can be changed with respect to one another. The weighting means consist of power amplifiers 212A, 212B, 212C and the control logic thereof.

The invention is preferably implemented by means of software, wherefore the transmitter 200 comprises a control unit 208 where the changing means 208 and the control logic for the weighting means are implemented by software. The invention can naturally also be implemented by means of integrated circuits providing the required functions. The invention also requires restricted changes in the software of the control units controlling the operation of the base station controller RNC, the base station B and the user equipment UE.

The receiver 220 comprises means 230 for performing measurements on the received signal transmitted via each different transmit antenna path, and means 230, 232 for signalling to the transmitter 200 the weighting coefficient data formed on the basis of the measurements. The measuring means 230 are prior art devices. Similarly, the signalling means 230, 232 are known, i.e. in practice they consist of the signalling software and the transmitter of the user equipment UE. The weighting coefficient data signalling is transmitted in the form of a radio signal 250 by a transmit antenna 234.

The transmitter 200 comprises means 216 for receiving the weighting coefficient data signalling, and the changing means 208 form the weighting coefficients by means of the signalling. The reception means 216 consist of the radio receiver 216 with the antennas 218 and the signalling software. The changing means 208 are preferably implemented by software.

The transmitter 200 comprises means 208, 216 for forming a quality value for the weighting coefficient data signalling it has received, and the changing means 208 form weighting coefficients by means of the quality value of the signalling and the signalling itself. The means for forming the quality value are previously known.

The transmitter 200 comprises means 208 for signalling to the receiver the weighting coefficients or the identification data of the group of weighting coefficients used in the transmission by means of pilot or identification bits inserted in the transmitted signal 240, 242. This concerns accurately restricted changes made in the signalling software.

The user equipment UE can comprise means 230 for determining the weighting coefficients used by the network part of the radio system when transmitting to the user equipment UE in question. This is a decision-making logic preferably implemented by software, utilizing the rules described above in connection with the method.

The network part RNS can comprise decision-making means 208 for determining the weighting coefficients used in the transmission. This is preferably a decision-making logic implemented by software, utilizing the rules described above in connection with the method.

Even though the invention is described above with reference to an example according to the accompanying drawings, it is clear that the invention is not restricted thereto but it can be modified in several ways within the scope of the inventive idea disclosed in the appended claims.

The invention claimed is:

1. A method of transmitting a digital signal from transmitters of at least two base stations to a receiver in a radio system, the method comprising:
   the transmitter transmitting the signal via at least two different transmit antenna paths, the transmit antenna paths being connected to at least two different base stations;
   wherein transmit power of the signals to be transmitted via different transmit antenna paths are weighted with respect to one another in the transmitter using changeable weighting coefficients determined for each transmit antenna path;
   wherein the transmitter receives from the receiver weighting coefficient data formed on the basis of measurements performed by the receiver on the received signals, and the transmitter forms weighting coefficients using the weighting coefficient data;
   wherein the weighting coefficient data comprises differential information indicating how the ratios of the weighting coefficients for the transmit antenna paths are changed differentially.

2. A radio system for transmitting a digital signal, comprising:
   transmitters of at least two different base stations for transmitting a signal;
   at least two transmit antenna paths that can be connected to the transmitters of at least two different base stations;
   a receiver for receiving the signal;
   wherein the transmitter comprises
   changing means for changing the weighting coefficients determined for each transmit antenna path with respect to one another,
   receiving means for receiving from the receiver weighting coefficient data formed on the basis of measurements performed by the receiver on the received signals, and
   weighting means for weighting transmit power of the signals to be transmitted via different transmit antenna paths using weighting coefficients that can be changed with respect to one another, and the weighting means forms weighting coefficients using the weighting coefficient data, wherein the weighting coefficient data comprises differential information indicating how the ratios of the weighting coefficients for the transmit antenna paths are changed differentially.

3. A transmitter being configured to transmit a digital signal to a receiver in a radio system, the transmitter comprising:
   means for transmitting the signal via at least two different transmit antenna paths, the transmit antenna paths being connected to at least two different base stations;
   means for weighting transmit power of the signals to be transmitted via different transmit antenna paths with respect to one another using changeable weighting coefficients determined for each transmit antenna path;
   means for receiving from the receiver weighting coefficient data formed based on measurements performed by the receiver on the received signals, and
   means for forming the weighting coefficients using the received weighting coefficient data,
   wherein the weighting coefficient data comprises differential information indicating how the ratios of the weighting coefficients for the transmit antenna paths are changed differentially.

4. A transmitter being configured to transmit a digital signal to a receiver in a radio system, the transmitter comprising:
   a plurality of transmitters configured to transmit the signal via at least two different transmit antenna paths, the transmit antenna paths being connected to at least two different base stations;
   transmission power weighting controller configured to weight transmit power of the signals to be transmitted via different transmit antenna paths with respect to one another using changeable weighting coefficients determined for each transmit antenna path;
   at least one transceiver for receiving from the receiver weighting coefficient data formed based on measurements performed by the receiver on the received signals, and
   a weighting coefficient formation component configured to form the weighting coefficients using the received weighting coefficient data,
   wherein the weighting coefficient data comprises differential information indicating how the ratios of the weighting coefficients for the transmit antenna paths are changed differentially.

* * * * *